United States Patent [19]

Adams

[11] Patent Number: 5,078,356

[45] Date of Patent: Jan. 7, 1992

[54] SUCTION CUP HAVING AN OFFSET-MOUNTED HOOK

[75] Inventor: William E. Adams, Butler, Pa.

[73] Assignee: Adams Mfg., Portersville, Pa.

[21] Appl. No.: 493,806

[22] Filed: Mar. 15, 1990

[51] Int. Cl.$^5$ .............................................. F16B 47/00
[52] U.S. Cl. ................................ 248/206.2; 248/309.3
[58] Field of Search ............... 248/205.5, 205.6, 205.7, 248/205.8, 205.9, 206.1, 206.2, 206.3, 309.3, 362

[56] References Cited

U.S. PATENT DOCUMENTS

| | | | |
|---|---|---|---|
| D. 302,107 | 11/1989 | Adams | D8/354 |
| 1,859,893 | 5/1932 | Ritz-Woller . | |
| 2,206,159 | 7/1940 | Burgard | 248/205.5 |
| 2,502,714 | 4/1950 | Garnett | 248/406 |
| 4,456,210 | 6/1984 | McBride | 248/205.5 |

FOREIGN PATENT DOCUMENTS

| | | | |
|---|---|---|---|
| 0549130 | 11/1959 | Belgium | 248/205.5 |
| 1369520 | 7/1964 | France | 248/205.7 |
| 1479570 | 5/1967 | France | 248/205.5 |
| 0608281 | 9/1960 | Italy | 248/205.7 |
| 0106745 | 9/1924 | Switzerland | 248/205.5 |
| 699748 | 11/1953 | United Kingdom . | |

OTHER PUBLICATIONS

Japanese Catalogue.
Product Sheet of Adams Mfg. entitled "Fasteners That Fasten".

*Primary Examiner*—Ramon O. Ramirez

[57] ABSTRACT

A device is disclosed which utilizes either an offset-mounted hook, or an offset-mounted hook combined with an oval shaped cup body. The suction cup has a cup neck located in a position which allows the vacuum chamber between the cup and the mounting surface to be equidistant from all points on the perimeter of the cup when the cup is under a load. The hook which is attached to the cup neck is mounted along the perimeter thereof to assure proper orientation of the asymmetrical device.

11 Claims, 2 Drawing Sheets

SUCTION CUP HAVING AN OFFSET-MOUNTED HOOK

BACKGROUND OF THE INVENTION

1. Field of the Invention

The present invention relates to a device for suspending small articles from a vertical surface. More specifically, the invention relates to a suction cup and hook in which the hook is mounted on the cup offset from the geometric center of the cup, allowing for greater holding ability.

2. Description of the Prior Art

Suction cups with attached hooks for hanging objects have been available for many years. The prior art is characterized by a device having a cup portion and a hook portion. The cup portion is formed from a single piece of molded plastic or rubber and has a concave front face. The cup portion has a neck extending outwardly from the rear face, opposite the concave front face. The neck is located at the geometric center of the rear face of the cup portion. A hook, usually constructed of hard plastic or metal, is affixed to the neck of the cup portion, and may be permanently mounted or removable.

The suction cup is mounted on a smooth vertical surface by compressing the concave front face of the cup against the vertical surface, forcing the air out of the concave space formed by the front face and the vertical surface. The soft cup then creates a seal around this chamber and air is prevented from re-entering it. The cup is thus secured in place. Lightweight objects may then be suspended from the hook attached to the cup neck.

One problem with this prior art device is that over time, air tends to leak back into the vacuum chamber between the cup and the vertical surface when the device is under a load. One reason for this slow leakage is that the weight of an object suspended from the neck distorts the concave face of the cup, pulling part of the cup away from the vertical surface. As shown in FIG. 1, the neck 3 of cup 1 has been displaced downwardly, causing the chamber 2 beneath the cup to shift upwardly. The chamber 2 is displaced in such a fashion that the air outside the perimeter of the cup may be drawn into the chamber 2 by the vacuum created therein. The distance 5 between the chamber 2 and the perimeter of the cup 1 is markedly less than corresponding distance 6 at the opposite end of the cup 1. This disproportionate distance 5 permits increased air leakage in area 4 between the exterior environment and the chamber 2. This eventually causes the vacuum within the chamber 2 to dissipate, and the cup to fall.

What is lacking in the art, therefore, is a device which utilizes a suction cup designed to resist the flow of air from the environment outside the cup to the chamber between the cup and the mounting surface while the cup is under a load.

SUMMARY OF THE INVENTION

A device is disclosed which utilizes either an offset-mounted hook, or an offset-mounted hook combined with an oval shaped cup body. The cup is designed to be mounted on a vertical surface in the same manner as prior art suction cups. The cup neck of my device is located in a position which allows a more uniform settlement of the chamber under the cup, when the cup is distorted by the weight of an object suspended therefrom. The cup neck is preferably mounted at a point which will allow the chamber to be equidistant from all points on the perimeter of the cup when the cup is under a load. A hook which is attached to the cup neck is permanently mounted therein to assure proper orientation of the asymmetrical device.

These and other advantages and features of the present invention will be more fully understood with reference to the presently preferred embodiments thereof and to the appended drawings.

DESCRIPTION OF THE PREFERRED EMBODIMENTS

Figure 1:
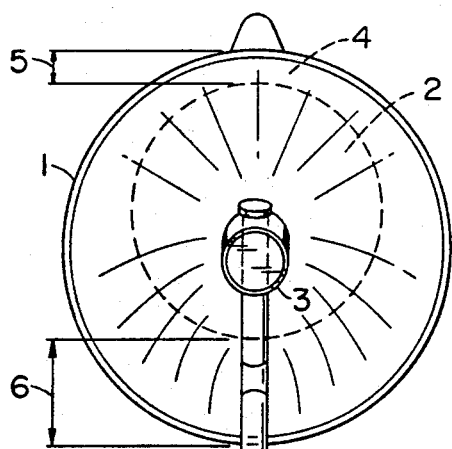
FIG. 1 is a front plan view of a prior art device pressed against a flat surface.
Figure 2:
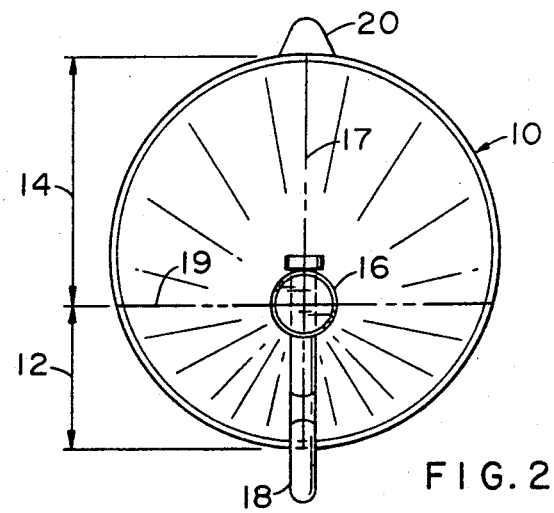
FIG. 2 is a front plan view of a first present preferred embodiment of the suction cup device.

Two present preferred embodiments of my suction cup having an offset hook are illustrated in the figures beginning with FIG. 2. The first embodiment of the device, shown in FIGS. 2 through 6, utilizes a cup body 10 having a neck 16 extending outwardly therefrom. The cup neck 16 is mounted offset from the geometric center of the cup body 10. The cup body 10 is thus divided by chord 19 which passes through cup neck 16. This creates two sections, large cup portion 14 and small cup portion 12. The cup body 10 is also divided into left and right hemispheres, as shown in FIG. 1, by major diameter 17. The cup neck 16 is located on the major diameter 17 of the cup body 10. The preferred location of the cup neck 16 on major diameter 17 is such that the ratio of long cup radius 24 along major diameter 17 (see FIG. 3) of large cup portion 14 to short cup radius 22 of small cup portion 12 along major diameter 17 is between 1.5:1 to 2:1.

A hook 18 is mounted within the cup neck 16 and is axially rotatable therein. The hook 18 is, however, mounted within cup neck 16 such that it cannot be rotated with respect to the perimeter of cup neck 16. This insures that hook 18 is always properly registered with the offset cup neck 16. The device should therefore be mounted and utilized so that the hook and cup body are in the proper orientation.

A tab 20 is optionally placed on the perimeter of the cup body 10 to facilitate removal. If the tab is utilized, it may be located on the perimeter of the cup body 10 at a point opposite the hook from which objects will be hung.

Figure 3:
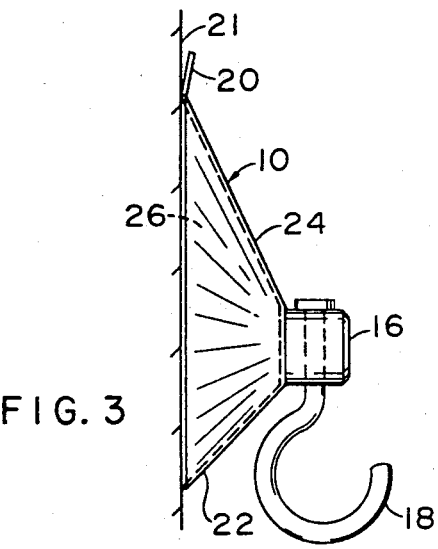
FIG. 3 is a side view of the device of FIG. 2 pressed against a flat surface.

Referring to FIG. 3, the vacuum chamber 26 is shown as being bounded by the cup body 10 and the mounting surface 21. The cup neck 16 divides the outer surface of the cup body 10 into a short cup radius 22, corresponding to small cup portion 12 of FIG. 2, and long cup radius 24, corresponding to large cup portion 14.

Figure 4:
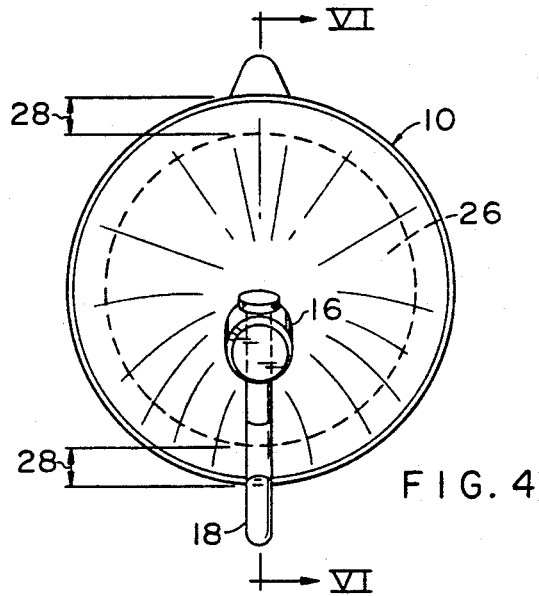
FIG. 4 is a front plan view of the device of FIG. 2 which is under a load.
Figure 5:
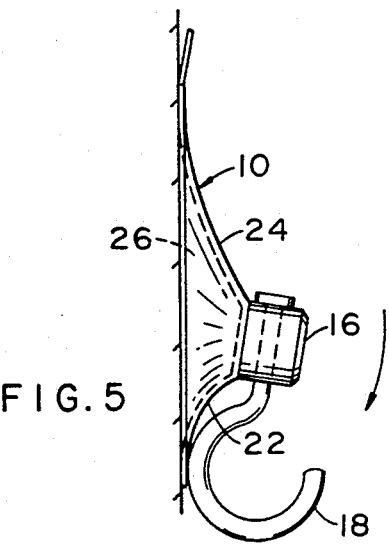
FIG. 5 is a side view of the device shown in FIG. 4.
Figure 6:
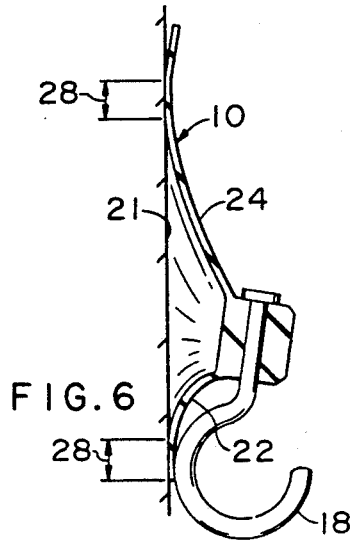
FIG. 6 is a sectional view of the device of FIG. 4, taken along line VI—VI.
Figure 7:
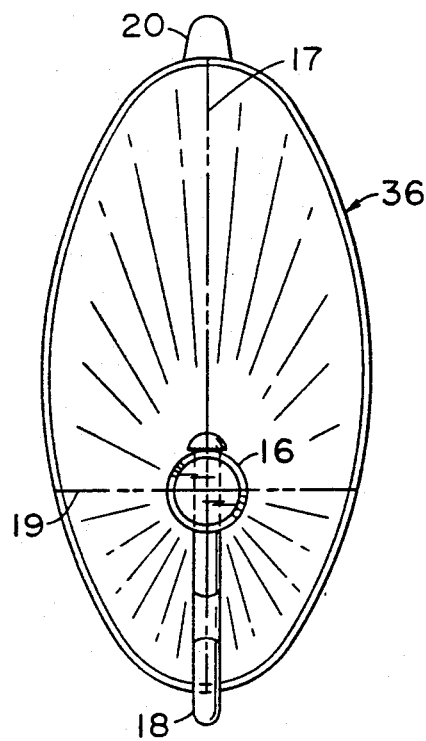
FIG. 7 is a front plan view of a second preferred embodiment of the suction cup device.

When the device is in use, an object is suspended from the hook 18. The weight of the suspended object causes the cup neck 16 to bend and distort the cup body 10 as shown in FIGS. 4 and 5. The cup neck 16 is bent forward in the direction of the arrow of FIG. 5. Both long and short cup radii 24 and 22, respectively, are bent into curved shapes, and the vacuum chamber 26 is displaced from its resting position. As shown in FIG. 4, however, the offset location of the cup neck 16 allows the vacuum chamber 26 to be evenly spaced from the outer perimeter of the cup body 10 while under the load. Distance 28 is therefore substantially constant about the entire perimeter of the cup body 10. This constant spacing helps to prevent air from leaking into the vacuum chamber 26 from the exterior environment. The equal spacing of distance 28 is more clearly shown in FIG. 6, in which the contact surface between the cup body 10 and the mounting surface is equal for both the long cup radius 24 and the short cup radius 22.

As previously stated, the cup body and hook are fixed with relation to each other to prevent rotation of the hook around the neck. Therefore, the hook 18 will always be pointed in a fixed direction corresponding to short cup radius 22 as shown in FIGS. 2 through 6. This insures that the large cup portion 14 will always be at the top of the cup body 10, as shown in FIGS. 2 through 6, and that the vacuum chamber 26 will always be displaced into the proper position when the device is under a load.

Figure 8:
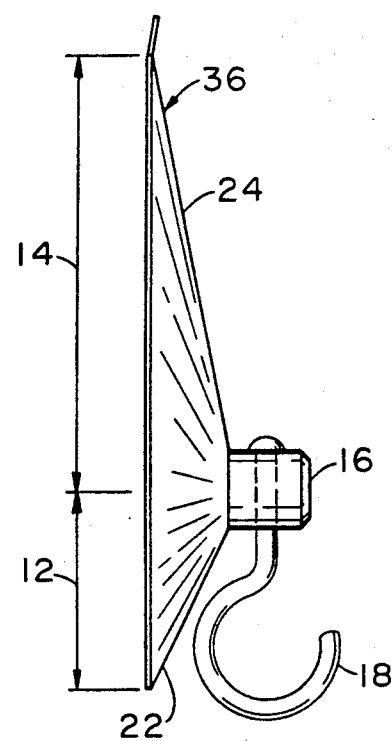
FIG. 8 is a side view of the device of FIG. 7.

A second preferred embodiment of the device is illustrated in FIGS. 7 through 10. The second embodiment is quite similar to the first embodiment, save that the cup body 36 is oval or elliptical in shape, as compared to the circular cup body 10. A chord 19 passing through the cup head 16 separates the cup body 36 into a large cup portion 14 and a small cup portion 12, as shown in FIG. 8. The relationship between the small cup portion 12 and the large cup portion 14 is the same as that of the first embodiment. The cup body 36 is thus divided by chord 19 which passes through cup neck 16. This creates two sections, large cup portion 14 and small cup portion 12. The cup body 36 is also divided into left and right hemispheres, as shown in FIG. 1, by major diameter 17. The cup neck 16 is located on the major diameter of the cup body 36. The preferred location of the cup neck 16 on major diameter 17 is such that the ratio of the length of long cup radius 24 along major diameter 17 (see FIG. 3) of large cup portion 14 to the length of short cup radius 22 of small cup portion 12 along major diameter 17 is between 1.5:1 to 2:1.

A hook 18 is axially rotatably mounted within the cup neck 16, but is nonrotatably mounted with respect to its orientation about the perimeter of cup neck 16. This insures that the hook 18 is always properly oriented with relation to the offset cup neck 16. The device should therefore be mounted and utilized so that the hook and cup body are in the proper orientation. This insures that the large cup portion 14 will always be at the top of the cup body 36, and that the vacuum chamber 26 will always be displaced into the proper position when the device is under a load.

A tab 20 is optionally placed on the perimeter of the cup body 36 to facilitate removal. If the tab is utilized, it is may be located on the perimeter of the cup body 36 at a point opposite the hook from which objects will be hung.

Figure 9:
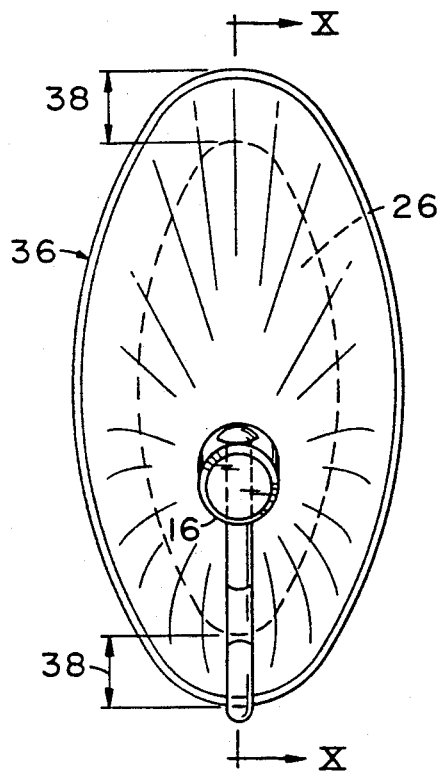
FIG. 9 is a front plan view of the device of FIG. 7 which is under a load.
Figure 10:
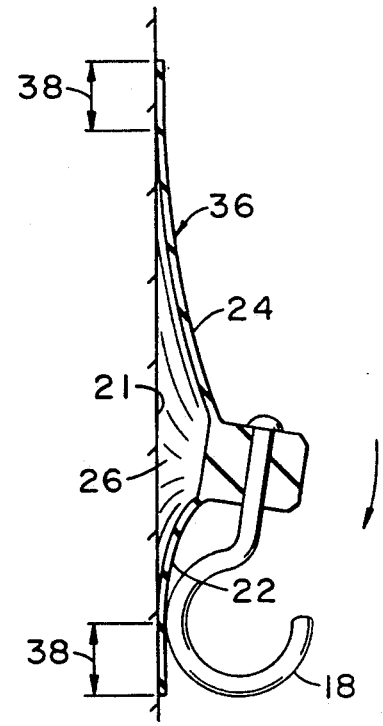
FIG. 10 is a sectional view of the device shown in FIG. 9, taken along line X—X.

A vacuum chamber 26 is created by the cup body 36 and the mounting surface 21, as shown in FIG. 10. Similar to the first embodiment, when the device is in use, an object is suspended from the hook 18. The weight of the suspended object causes the cup neck 16 to bend and distort the cup body 36 as shown in FIGS. 9 and 10. The cup neck 16 is bent forward in the direction of the arrow of FIG. 10. Both long and short cup radii 24 and 22, respectively, are bent into curved shapes, and the vacuum chamber 26 is displaced from its resting position. As shown in FIG. 9, however, the offset location of the cup neck 16 allows the vacuum chamber 26 to be evenly spaced from the outer perimeter of the cup body 36. Distance 38 is therefore substantially constant about the entire perimeter of the cup body 36. This constant spacing helps to prevent air from leaking into the vacuum chamber 26 from the exterior environment.

While I have described a present preferred embodiment of the invention, it is to be distinctly understood that the invention is not limited thereto but may be otherwise embodied and practiced within the scope of the following claims.

I claim:

1. A suction cup device for mounting on a flat surface, comprising:
    a cup section having a concave front face and a rear face, the concave front face adapted to be affixed to the flat surface, forming an air space therebetween;
    a neck section extending outwardly from the rear face and offset from the geometric center of the rear face, to a position such that when the neck is displaced by a preselected load, the air space between the cup section and the flat surface is substantially equidistant from any perimeter point of the cup section.

2. A suction cup device as described in claim 1, further comprising hook means, affixed to the neck.

3. A suction cup device as described in claim 2, wherein the hook means is permanently affixed to the neck.

4. A suction cup device as described in claim 1, wherein is divided into a top portion and a bottom portion by a chord through the geometric center of the cup portion, and wherein the neck is located in the bottom portion.

5. A suction cup device as described in claim 4, wherein hook means are affixed to the neck, the hook means having a hook body extending outwardly from the neck, the hook body extending away from the top portion of the cup.

6. A suction cup device as described in claim 5, wherein the cup section has a perimeter edge, the cup section further comprising a tab extending outwardly therefrom.

7. A suction cup device as described in claim 6, wherein the tab is located on the perimeter edge of the cup in the top portion of the cup.

8. A suction cup device as described in claim 1, wherein the cup is circular in shape.

9. A suction cup device as described in claim 1, wherein the cup is oval in shape.

10. A suction cup device as described in claim 1, wherein the cup section has a perimeter edge, the cup section further comprising a tab extending outwardly therefrom.

11. A suction cup device as described in claim 1, wherein the cup is bisected by a major diameter, the neck mounted on said major diameter and dividing the major diameter into a long and a short radius such that the ratio of the radii is within the range of 1.5:1 to 2:1.

* * * * *